United States Patent
Wood

(10) Patent No.: US 8,204,445 B2
(45) Date of Patent: Jun. 19, 2012

(54) DETECTING SIGNALS

(75) Inventor: Peter Wood, Cambridge (GB)

(73) Assignee: Cambridge Silicon Radio Limited, Cambridge (GB)

(*) Notice: Subject to any disclaimer, the term of this patent is extended or adjusted under 35 U.S.C. 154(b) by 967 days.

(21) Appl. No.: 11/815,026

(22) PCT Filed: Jan. 30, 2006

(86) PCT No.: PCT/GB2006/000299
§ 371 (c)(1),
(2), (4) Date: Dec. 18, 2007

(87) PCT Pub. No.: WO2006/082379
PCT Pub. Date: Aug. 10, 2006

(65) Prior Publication Data
US 2010/0041358 A1    Feb. 18, 2010

(51) Int. Cl.
*H04B 17/00* (2006.01)
*H04B 17/02* (2006.01)
*H04M 1/00* (2006.01)

(52) U.S. Cl. .......... 455/67.11; 455/67.13; 455/135; 455/226.1; 455/552.1

(58) Field of Classification Search ............ 455/63.1, 455/67.11, 67.13, 67.7, 226.1–226.4, 132–135, 455/552.1–553.1
See application file for complete search history.

(56) References Cited

U.S. PATENT DOCUMENTS

| | | | |
|---|---|---|---|
| 4,355,411 A * | 10/1982 | Reudink et al. | 455/437 |
| 6,711,380 B1 * | 3/2004 | Callaway, Jr. | 455/41.2 |
| 6,928,266 B1 * | 8/2005 | Nevo et al. | 455/63.3 |
| 7,103,316 B1 * | 9/2006 | Hall | 455/63.1 |
| 7,171,161 B2 * | 1/2007 | Miller | 455/67.11 |
| 7,292,656 B2 * | 11/2007 | Kloper et al. | 375/340 |
| 7,313,366 B1 * | 12/2007 | Bristow | 455/63.1 |
| 7,424,268 B2 * | 9/2008 | Diener et al. | 455/62 |
| 7,640,022 B2 * | 12/2009 | Salokannel et al. | 455/452.2 |
| 7,692,532 B2 * | 4/2010 | Fischer et al. | 340/10.2 |
| 2003/0119558 A1 * | 6/2003 | Steadman et al. | 455/562 |
| 2004/0203392 A1 * | 10/2004 | Hsu et al. | 455/62 |
| 2005/0020271 A1 * | 1/2005 | Fukuda et al. | 455/447 |

OTHER PUBLICATIONS

International Preliminary Report on Patentability, PCT Application No. PCT/GB06/000299, Aug. 16, 2007.

* cited by examiner

*Primary Examiner* — Simon Nguyen
(74) *Attorney, Agent, or Firm* — Novak Druce DeLuca+Quigg LLP

(57) ABSTRACT

A receiver device comprising: a frequency hopping radio receiver for operation according to a frequency hopping radio protocol and arranged to detect the presence of interference characteristic of a predetermined other radio protocol; and a user-alerting unit responsive to the receiver; the receiver device being configurable to actuate the user-alerting unit for alerting a user in response to the detection of interference characteristic of the other radio protocol.

17 Claims, 1 Drawing Sheet

DETECTING SIGNALS

Figure 1:
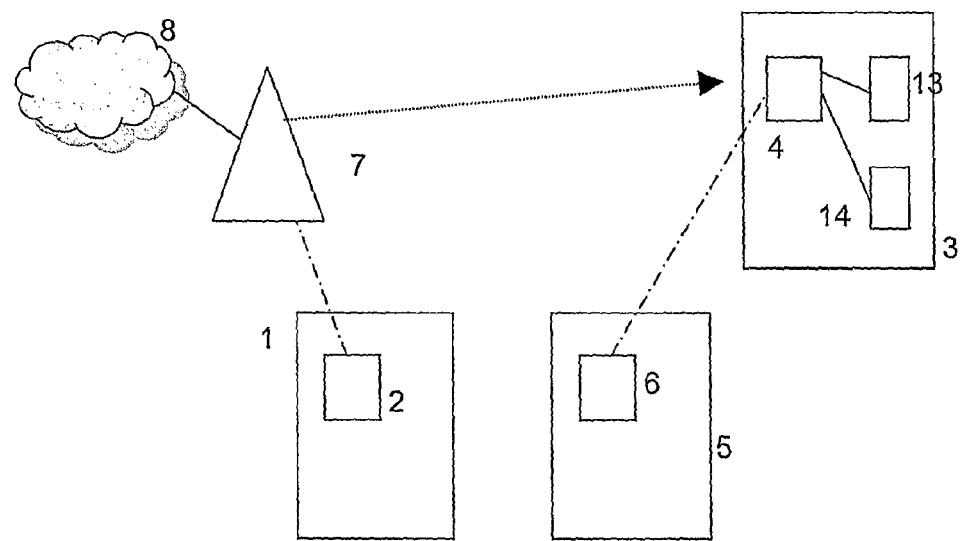

This invention relates to detecting wireless signals, and especially to detecting signals of one network (for instance a wireless LAN) using a receiver intended for another network (for instance a Bluetooth receiver).

Laptop computers and other portable devices such as cameras and PDAs (personal digital assistants) are now commonly equipped with radio transceivers that allow them to be connected to wireless local area network (WLAN) points for the transfer of data. One example of a set of commonly used wireless network standards is the IEEE 802.11 system. In such a system access points are provided at fixed locations. Other devices can connect by radio to an access point and thereby transmit and receive data to and from a network to which the access point is connected. Typically, the access point will be connected to the internet.

Access points are increasingly being provided in public locations such as cafes, hotels and airports. Users who find themselves in such locations can wirelessly connect their devices to an access point and thus exchange data with remote computers.

The user needs to locate an access point that he can connect to. When a wireless network radio transceiver in, for example, a user's laptop is turned on it can search for signals from access points nearby and alert a user to the availability of a wireless network. However, portable devices are normally battery-powered and to reduce power consumption the user normally turns the wireless network radio transceiver off if it is not in use. Therefore, the user cannot normally rely on the wireless network radio transceiver to find an access point for him to connect to. One option to make it easier for the user to locate wireless network signals is for the wireless network radio transceiver to periodically turn on and scan for wireless network signals. However, in many situations the user might want to completely turn off the device in which the transceiver is fitted when there is no signal. For example, if the transceiver is in a laptop computer and the user simply wants to use the computer to access a remote network via a wireless network then he might not leave the computer on to allow it to detect wireless network signals since that would use up the laptop's power for potentially no gain.

Most access points are advertised by signs at the location where they provide coverage. However, the signs are often small, and in a cluttered environment such as an airport or a cafe it can be difficult for a user to notice the signs.

There is therefore a need for an improved way for a user to be able to identify that a wireless network point is nearby.

An increasing number of devices are being equipped with short range frequency-hopping radio systems such as Bluetooth. Examples of these devices include wireless headsets, mobile phones, laptop computers, wireless mice and PDAs. Such radio systems have relatively low power usage and are normally left powered on all the time, especially since for many of these devices the use of the radio system is essential for the operation of the device. For example, it is common for users of mobile phones to carry a wireless headset, and since an incoming call could be received at any time the radio transceiver of the headset must remain operational continuously so that it can be informed by the mobile phone of the incoming call.

According to one aspect of the present invention there is provided a receiver device comprising: a frequency hopping radio receiver for operation according to a frequency hopping radio protocol and arranged to detect the presence of interference characteristic of a predetermined other radio protocol; and a user-alerting unit responsive to the receiver; the receiver device being configurable to actuate the user-alerting unit for alerting a user in response to the detection of interference characteristic of the other radio protocol.

According to a second aspect of the present invention there is provided a method of alerting a user to the detection of the presence of interference characteristic of a wireless LAN system, the method comprising: detecting by means of a frequency hopping radio receiver for operation according to a frequency hopping radio protocol the presence of interference characteristic of another radio protocol; and alerting a user by means of a user-alerting unit in response to the detection of interference characteristic of the other radio protocol.

Preferably the receiver device comprises a user actuable control whereby the user can configure the device to actuate the user-alerting unit in response to the detection of interference characteristic of the other radio protocol. The user-alerting device may be an audio device operation of which generates an audible signal for a user. The user-alerting device may be a video device operation of which generates a visual signal for a user. That could be the display of a computer that incorporates or is attached to the receiver device, and operates to display the visual signal under the control of software operating on the computer and communicating with the receiver device.

The receiver may be arranged to identify the presence of interference characteristic of the other radio protocol by identifying interference on one or more channels of the frequency hopping system that remains over a predetermined period of time.

The receiver may be arranged to identify the presence of interference characteristic of the other radio protocol by identifying interference on a predetermined number of adjacent channels of the frequency hopping system.

The receiver may be arranged to identify the presence of interference characteristic of the other radio protocol by identifying interference on a predetermined number of adjacent channels of the frequency hopping system that with frequency rises to a peak and then diminishes over that set of channels.

The receiver may be arranged to identify the presence of interference characteristic of the other radio protocol by identifying interference on a predetermined number of adjacent channels of the frequency hopping system that with frequency rises to a peak substantially at the centre frequency of a channel of the other radio protocol and then diminishes over that set of channels.

The receiver may be arranged to identify the presence of interference characteristic of the other radio protocol by detecting one or more of the following characteristics and either taking the presence of such a characteristic as indicating the presence of interference; or determining a value based on the extent to which that characteristic is present, optionally applying a weighting to that value by multiplying it by a predetermined weighting factor, summing the results of the multiplications if there are more than one, and taking the result as indicating the presence of interference if it exceeds a predetermined threshold. The characteristics are:

1. Interference on a certain FH (frequency hopping) channel remaining present at more than a predetermined threshold level for longer than a predetermined time 2. Interference present at more than a predetermined level on a predetermined number of adjacent FH channels.

3. Interference present at more than a predetermined level on a predetermined number of adjacent FH channels, with the interference on those channels increasing to a peak and then decreasing with increasing frequency.

4. Interference present at more than a predetermined level on a number of adjacent FH channels that occupy the width of a channel of the system to be detected.

5. Interference present at more than a predetermined level on a number of adjacent FH channels that occupy the width of a channel of the system to be detected, and falling off (optionally to below the same or another predetermined level) immediately outside that width.

6. Interference present at more than a predetermined level on a number of adjacent FH channels that occupy the width of a channel of the system to be detected and having its peak intensity centred about the centre frequency of a channel of the system to be detected.

7. Interference present at more than a predetermined level on a number of adjacent FH channels that occupy the width of a channel of the system to be detected and having its peak intensity centred about the centre frequency of a channel of the system to be detected, and falling off (optionally to below the same or another predetermined level) immediately outside that width.

The frequency hopping radio protocol may be Bluetooth, or it could be another protocol.

The other radio protocol could be a wireless LAN protocol, for example an IEEE 802.11 protocol, or it could be another protocol.

The present invention will now be described by way of example with reference to the accompanying drawing.

Figure 2:
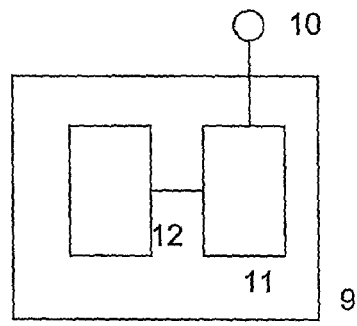

In the drawing:

FIG. 1 is a schematic diagram illustrating an embodiment of the invention in use; and FIG. 2 is a schematic diagram of a transceiver.

FIG. 1 shows a first device 1 that has a wireless LAN (local area network) IEEE 802.11 compatible transceiver 2. In this example, device 1 is a laptop computer. A second device 3 has a Bluetooth transceiver 4. In this example device 3 is a wireless headset that is configured for use with a mobile phone 5 which has its own Bluetooth transceiver 6 for communication with the transceiver 4 of headset 3. FIG. 1 also shows a WLAN IEEE 802.11 access point 7, which is connected to the internet 8 and which can communicate with the transceiver 2 of the laptop 1.

The Bluetooth transceivers 4 and 6 operate according to a frequency-hopping signalling scheme, in accordance with the Bluetooth standard. The transceivers are therefore capable of determining the level of radio interference at the various frequencies in the band over which they perform frequency hopping. In accordance with the present invention, in such a system such a transceiver analyses the detected interference in order to detect forms of interference that are characteristic of wireless LAN systems. In response to the detection of such forms of interference the transceiver then triggers the device of which it forms part to provide an alert to a user to inform the user of the presence of a wireless LAN system. The user can then choose to turn on a wireless LAN transceiver (e.g. transceiver 2) to allow his device with wireless LAN capability to connect to the detected wireless LAN system.

A transceiver suitable for use in detecting wireless LAN signals as described above is shown in FIG. 2. The transceiver 9 includes an antenna 10, a radio-frequency (RF) section 11 connected to the antenna for amplifying and demodulating received signals, and a base-band processor 12 connected to the RF section for generating signals to be transmitted and for decoding received signals. The base-band processor 12 also controls the operation of the RF section 11, for example for causing it to perform frequency hopping.

The detection of wireless LAN signals by transceiver 9 will now be described.

A frequency-hopping radio receiver, such as a Bluetooth receiver, can typically hop across many relatively narrow channels. Such a receiver can build up a picture of the energy signature of a received foreign transmission or interferer by analysing the characteristics of the foreign transmission in a number of the channels. Transmissions by interfering devices obeying different foreign protocols tend to have different signature characteristics. Therefore, it is possible for the frequency hopping receiver to discriminate between interfering transmissions of different protocols.

In the Bluetooth radio system, frequency hopping is performed for 79 channels 1 MHz wide in the range from 2402 to 2480 MHz. In the IEEE 802.11 system up to 14 channels 22 MHz wide are allocated in the range from 2412 to 2484 MHz. Therefore, a transmitter of 802.11 signals will interfere with some of the Bluetooth channels. Each 802.11 channel will interfere with 22 of the Bluetooth channels.

The centre frequencies of the available 802.11 channels are:

| Channel | Frequency |
|---------|-----------|
| 1 | 2412 MHz |
| 2 | 2417 MHz |
| 3 | 2422 MHz |
| 4 | 2427 MHz |
| 5 | 2432 MHz |
| 6 | 2437 MHz |
| 7 | 2442 MHz |
| 8 | 2447 MHz |
| 9 | 2452 MHz |
| 10 | 2457 MHz |
| 11 | 2462 MHz |
| 12 | 2467 MHz |
| 13 | 2472 MHz |
| 14 | 2484 MHz |

One simple way to detect 802.11 interferers is for the Bluetooth receiver to periodically scan the frequency range, and if interference is detected on a set of adjacent Bluetooth channels that correspond to an 802.11 channel then an 802.11 transmitter is determined to be nearby. Instead of scanning the frequency range deliberately, it could log detected interference whilst performing frequency hopping according to the designated pseudo-random frequency hopping scheme, and again if interference is detected on a set of nearby Bluetooth channels that correspond to an 802.11 channel then an 802.11 transmitter can be determined to be nearby.

In a more preferred scheme, heuristics are employed, most preferably in both the frequency and time domains, to allow 802.11 interferers to be detected more reliably. A number of factors are taken as potentially indicating the presence of 802.11 interference, and a score is allocated to each. If a total score greater than a pre-determined threshold value is attained then 802.11 interference is determined as being present. Factors that may be taken as potentially indicating the presence of 802.11 interference include:

1. Interference on a certain channel remaining present over time (e.g. 1 second). This suggests that the interferer is remaining on that channel (as an interfering 802.11 device would) and not hopping to other channels (as an interfering Bluetooth device would).

2. Interference on a number of adjacent channels (e.g. 20 adjacent 1 MHz channels).

3. Interference on a number of adjacent channels (e.g. 20 adjacent 1 MHz channels) with the interference on those channels increasing to a peak and then decreasing with increasing frequency.

4. Interference occupying the width of an 802.11 channel.

5. Interference occupying the specific frequency range of a defined 802.11 channel.

6. Interference over a set of adjacent channels and having its peak intensity centred about the centre frequency of a defined 802.11 channel.

The scores allocated to each indicator and the threshold total score can be selected dependant on the level of certainty required before the user is alerted.

In one preferred process for detecting 802.11 interference the receiver periodically scans the channels over its frequency range. If the channel spacing of the receiver is less than that of 802.11 then the receiver could scan a subset of its channels. If over two or three consecutive scans there is a channel on which interference over a threshold level has been detected on each scan then a more detailed scan is performed over the channels around that channel. A check is then performed of whether over a set of adjacent channels (e.g. 20 adjacent 1 MHz channels) around that channel the interference steadily increases to a peak and then steadily decreases. If it does so, a check is made as to whether the frequency of that peak is in the region of the centre frequency of an 802.11 channel. If it is then 802.11 interference is determined to be present. Instead of using a dedicated periodic scan to perform the initial search for interferers the system could scan whilst obeying frequency hopping according to the protocol in which it operates.

The centre frequency of the wireless LAN channel might coincide with the frequency of one of the frequency hopping channels or it might lie between two frequency hopping channels. The location of the peak could be determined as lying at or between the frequencies of the frequency hopping channels at which the highest and second-highest levels of interference are detected.

The process for detecting 802.11 interference could be combined with that for determining the frequencies to be used for adaptive frequency hopping (AFH) as mandated by version 1.2 of the Bluetooth standard. If the AFH process takes into account the detected presence of interference characteristic of an 802.11 device, then on such interference being detected the Bluetooth receiver may generate a signal that can be used to alert a user to the presence of such interference. It should be noted that the present invention relates to the use of such detection for a different purpose from AFH: that is the alerting of a user to the presence of interference characteristic of a certain other system.

The user should preferably be able to selectively enable or disable alerting to detected 802.11 interference since in some locations, such as a busy office, the alarm would otherwise be sounding continually.

In a typical implementation the receiver that is capable of identifying 802.11 interference is comprised in a product that can provide an alert to a user by (for example) visual or audible means. The product may also have a user interface whereby the user can indicate to the receiver whether or not an alert is to be provided when 802.11 interference is detected. Taking as an example the headset 3 of FIG. 1, it may have a toggle switch 13 for allowing the user to select whether alerts are to be provided, and a speaker 14 for emitting an alerting noise when 802.11 interference is detected.

The description above relates to the specific example of 802.11 interference being detected by a Bluetooth receiver. However, the present invention is applicable to other combinations of systems. Most preferably the detecting receiver (which may be a transceiver) is a frequency hopping receiver, so that it is conveniently capable of detecting interference over a range of channel frequencies. Most preferably the interfering system is not a frequency hopping system since then its interference will remain at relatively constant frequencies. The invention is most applicable for detecting other systems in shared bands such as the 2.4 GHz ISM band in which 802.11 and Bluetooth operate. Examples of other systems that could be detected include HomeRF and DECT.

The detection of interference characteristic of a wireless network signal may be signalled to the user in any suitable way. One convenient way is by means of an audio signal, such as a characteristic sound. Another convenient way is by means of a visual signal such as a flashing LED or an icon on a display.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A receiver device comprising:
a frequency hopping radio receiver for operation according to a frequency hopping radio protocol using multiple channels and arranged to detect the presence of a predetermined other radio protocol as interference with respect to said frequency hopping radio protocol, wherein said other radio protocol represents a wireless network protocol; and
a user-alerting unit responsive to the receiver;
the receiver being configurable to actuate the user-alerting unit for alerting a user of the presence of a wireless network to which the user may desire to connect, in response to the detection of the other radio protocol;
wherein the receiver is capable of identifying interference as being characteristic of the other radio protocol;
the receiver being configurable to log detected interference while performing frequency hopping according to the protocol in which the receiver operates.

2. A receiver device as claimed in claim 1, wherein the receiver device comprises a user actuable control whereby the user can configure the device to actuate the user-alerting unit in response to the detection of interference characteristic of the other radio protocol.

3. A receiver device as claimed in claim 2, wherein the user-alerting unit is an audio device operation of which generates an audible signal for a user.

4. A receiver device as claimed in claim 2, wherein the user-alerting unit is a video device operation of which generates a visual signal for a user.

5. A receiver device as claimed in claim 1, wherein the user-alerting device is an audio device operation of which generates an audible signal for a user.

6. A receiver device as claimed in claim 1, wherein the user-alerting device is a video device operation of which generates a visual signal for a user.

7. A receiver device as claimed in claim 1, wherein the receiver is arranged to identify the presence of interference characteristic of the other radio protocol by identifying interference on one or more channels of the frequency hopping system that remains over a predetermined period of time.

8. A receiver device as claimed in claim 1, wherein the receiver is arranged to identify the presence of interference characteristic of the other radio protocol by identifying interference on a predetermined number of adjacent channels of the frequency hopping system.

9. A receiver device as claimed in claim 8, wherein the receiver is arranged to identify the presence of interference characteristic of the other radio protocol by identifying interference on a predetermined number of adjacent channels of the frequency hopping system that with frequency rises to a peak and then diminishes over that set of channels.

10. A receiver device as claimed in claim 9, wherein the receiver is arranged to identify the presence of interference characteristic of the other radio protocol by identifying interference on a predetermined number of adjacent channels of the frequency hopping system that with frequency rises to a peak substantially at the centre frequency of a channel of the other radio protocol and then diminishes over that predetermined number of channels.

11. A receiver as claimed in claim 1, wherein the frequency hopping radio protocol is Bluetooth.

12. A receiver as claimed in claim 1, wherein the other radio protocol is a wireless LAN protocol.

13. A receiver as claimed in claim 1, wherein the other radio protocol is an IEEE 802.11 protocol.

14. A method of alerting a user to the presence of a wireless network of a first radio protocol, to which the user may desire to connect, the method comprising:
    detecting, by means of a frequency hopping radio receiver for operation according to a frequency hopping radio protocol using multiple channels, the presence of the first radio protocol as interference with respect to said frequency hopping radio protocol;
    alerting a user by means of a user-alerting unit in response to the detection of the first radio protocol; and
    identifying detected interference as being characteristic of the first radio protocol;
    wherein the step of detecting the presence of interference comprises logging detected interference while performing frequency hopping according to the protocol in which the receiver operates.

15. A method as claimed in claim 14, wherein the frequency hopping radio protocol is Bluetooth.

16. A method as claimed in claim 14, wherein the first radio protocol is a wireless LAN protocol.

17. A method as claimed in claim 14, wherein the first radio protocol is an IEEE 802.11 protocol.

* * * * *

UNITED STATES PATENT AND TRADEMARK OFFICE
CERTIFICATE OF CORRECTION

PATENT NO. : 8,204,445 B2  
APPLICATION NO. : 11/815026  
DATED : June 19, 2012  
INVENTOR(S) : Peter Wood Page 1 of 1

It is certified that error appears in the above-identified patent and that said Letters Patent is hereby corrected as shown below:

On the Title Page, Item No. (30) insert,
--(30) Foreign Application Priority Data
February 3, 2005  (GB)    0502255.3--.

Signed and Sealed this
Twenty-sixth Day of February, 2013

Teresa Stanek Rea
*Acting Director of the United States Patent and Trademark Office*